April 24, 1951     F. C. WILLIAMS ET AL     2,549,875
THERMIONIC VALVE CIRCUITS

Filed Aug. 6, 1947     6 Sheets—Sheet 1

*Inventors*
F. C. Williams
N. F. Moody
By— *Attorney*

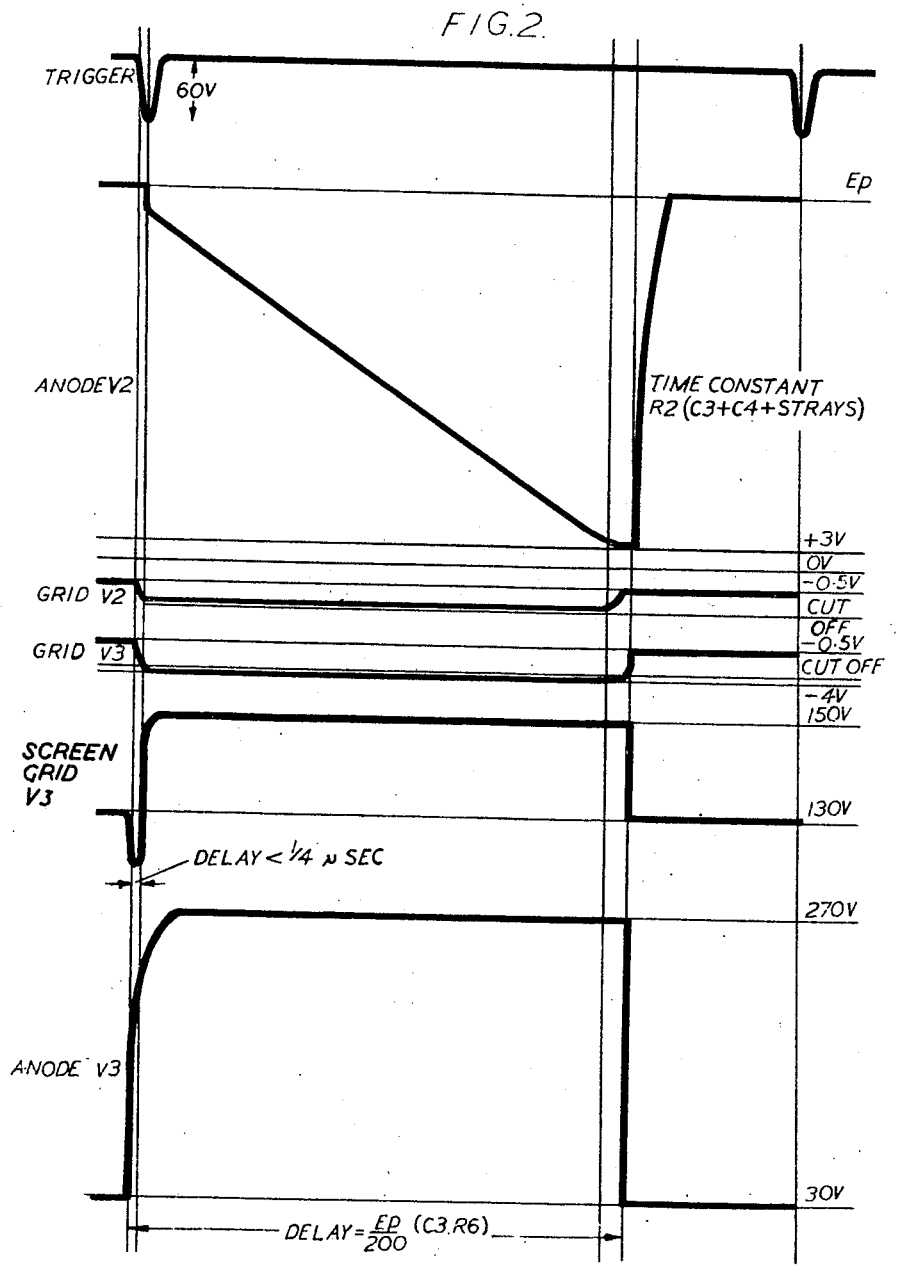

Inventors
F. C. Williams
N. F. Moody
By
Attorney

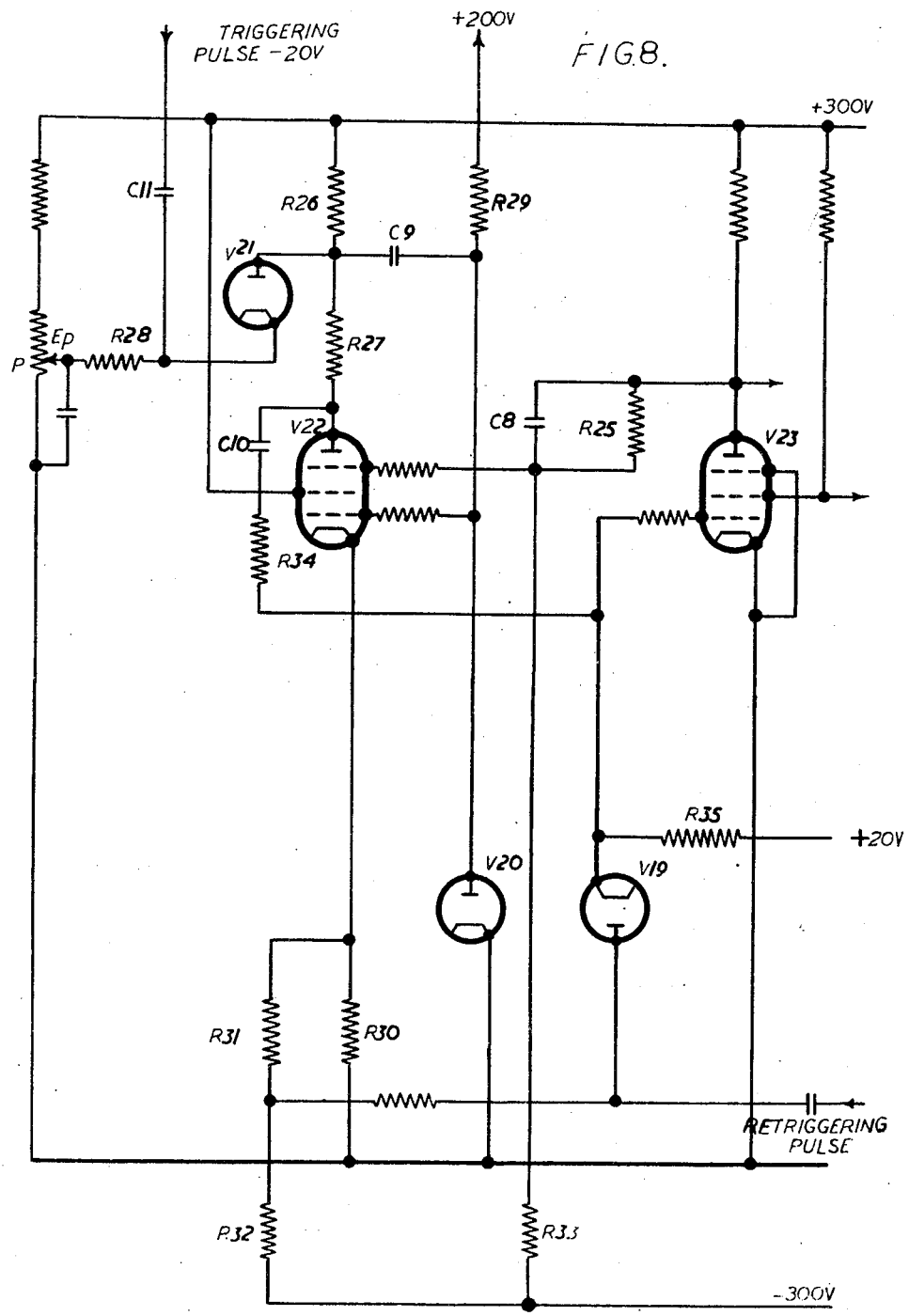

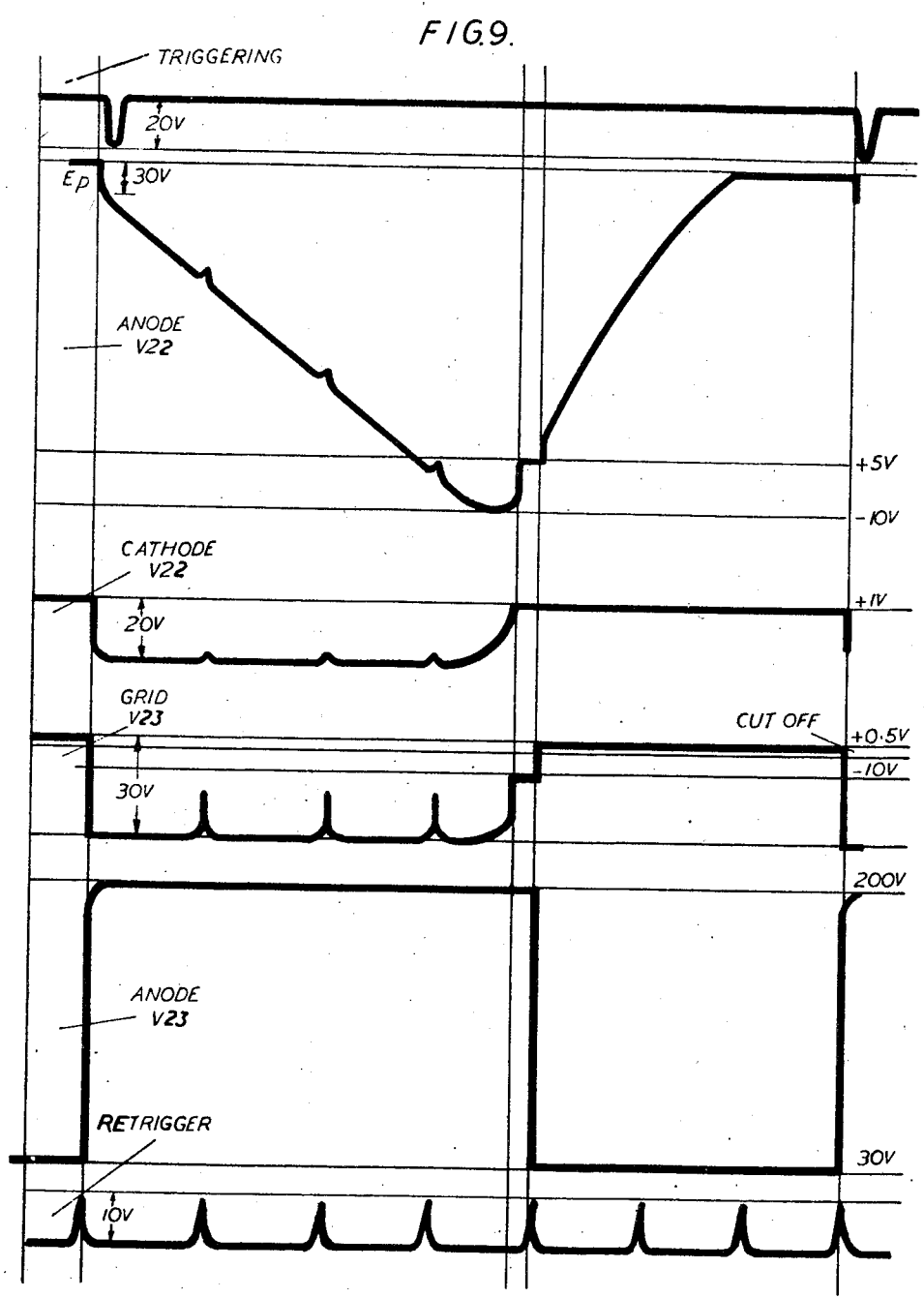

Patented Apr. 24, 1951

2,549,875

UNITED STATES PATENT OFFICE 2,549,875

THERMIONIC VALVE CIRCUITS

Frederic Calland Williams, Timperley, and Norman F. Moody, Cuffley, England

Application August 6, 1947, Serial No. 766,651
In Great Britain August 22, 1944

Section 1, Public Law 690, August 8, 1946
Patent expires August 22, 1964

12 Claims. (Cl. 250—27)

The present invention relates to thermionic valve circuits and is more particularly concerned with such employing a plurality of multi-electrode thermionic valves, the potentials of the electrodes of which, in response to an applied impulse, pass through a predetermined cycle of changes and then revert to a quiescent or stable condition.

A circuit of this general type is described and claimed in co-pending application of Frederic C. Williams entitled Electronic Relay Circuit Arrangements, filed July 21, 1947, Serial No. 762,375. The purpose of the circuit being to introduce a variable time delay between an applied impulse and the operative response to enable it to be used, among other applications, as a frequency counter or as a frequency divider.

An object of the present invention is to provide a circuit which will give a greater degree of precision, linearity and flexibility than the circuit described in the above-mentioned application.

In the circuit described in said co-pending application, a single multigrid thermionic valve is employed and the circuit is so arranged that in response to an applied impulse the anode voltage of the valve falls linearly to a predetermined level after which the potentials of the electrodes return to the stable condition. The duration of the cycle of changes, which depends, amongst other factors, upon the rate of fall of the anode voltage, is variable to provide the variable delay.

According to the present invention, the application of the impulse causes a linear fall or rundown of anode voltage of one of a plurality of valves while, at the termination of the rundown period, the return of the circuit to the quiescent condition is effected under the control of a second valve.

The following advantages are obtained by using a second valve:

(1) Greater linearity and accuracy are possible.
(2) Greater rates of fall of anode voltage are obtained.
(3) The circuit is more flexible and hence has a wider range of applications.
(4) Better wave forms are obtained.
(5) A smaller initial fall of anode voltage is obtained which is of importance when the circuit is employed for providing a time base for a cathode ray tube.

According to a feature of the invention, the application of the impulse causes a linear fall or rundown of anode voltage of one of the valves, the commencement of the rundown period and the return of the circuit to its quiescent condition being effected under the control of a second valve.

According to a further feature of the invention, the application of an impulse to an electrode of one of the valves causes a linear fall or rundown of anode voltage of said valve while, at the termination of the rundown period, the return of the circuit to the quiescent condition is effected under the control of a second valve.

In one embodiment of the invention, two sets of triggering pulses are applied to the circuit, one of which initiates the cycle of changes while the other controls the return to the quiescent condition after the linear run-down period.

The invention will be better understood from the following description of three embodiments taken in conjunction with the accompanying drawings in which:

Figure 2 shows the waveforms developed in the circuit of Figure 1.

Figure 8 shows the circuit of a third embodiment of the invention, and

Figure 9 shows the waveforms developed in the circuit of Figure 8.

Figure 1:
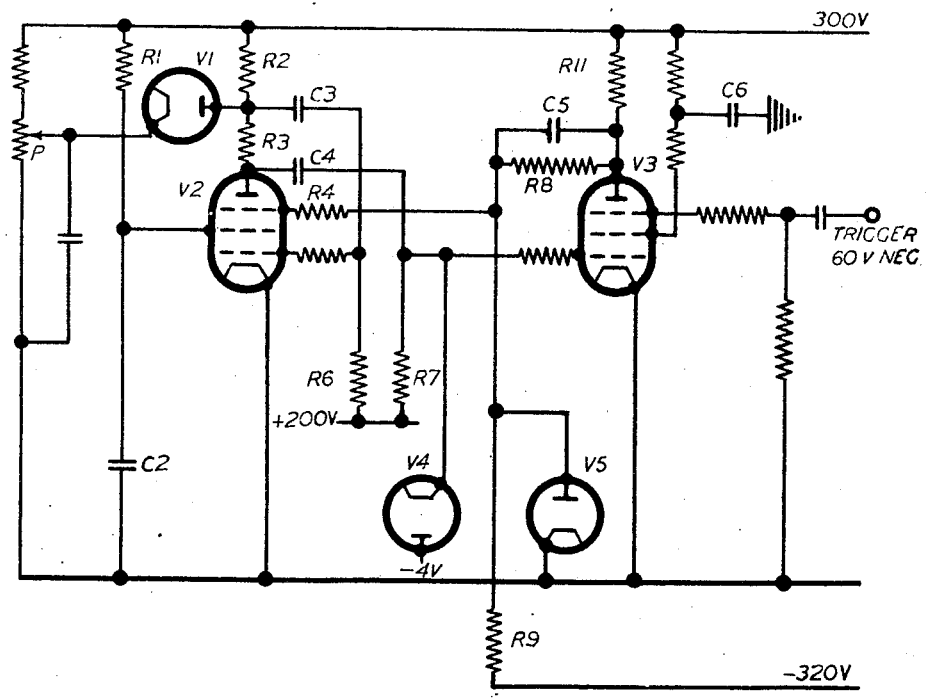
Figure 1 shows the circuit of one embodiment of the invention.

Referring first to Figure 1, both the valves V2 and V3 (which are of the Mullard EF50 type) are taking grid current in the quiescent condition due to the connection of their grids to a source of +200 volts through resistances R6 and R7 respectively. Further V3 is operating below the knee of the anode current/anode voltage characteristic of the valve and the anode voltage is thus low. A D. C. connection exists between the anode of the valve V3 and the suppressor grid of V2 through R8 and R4. A resistance R9 is also connected to R4 and to a source of —320 volts with the result that the suppressor grid of V2 is negative at this time and the valve is cut off on its suppressor grid, the screen grid taking all the space current. When this state of affairs is brought about the anode voltage of V2 tends to rise to the H. T. voltage, but the diode V1 conducts when the anode voltage reaches a value $E_p$ determined by the potentiometer P and the anode voltage is thus prevented from rising beyond this value. While a D. C. connection is shown between the anode of V3 and the suppressor grid of V2, an A. C. connection may be employed but the circuit is not then so reliable.

The circuit is triggered by a negative impulse of approximately 60 volts amplitude applied to the suppressor grid of the valve V3. When this occurs, the valve is cut off and the anode voltage rises rapidly. The anode resistance R11 has a low value (e. g. 15,000 ohms). This sharp rise in anode voltage is transferred through the condenser C5 to the suppressor grid of V2 resulting in a flow of anode current in V2. The anode voltage of V2 thus falls without appreciable time delay after the initial edge of the triggering impulse (see Figure 2). The anode load of V2 consists of two resistances, R2 and R3 and the control grid of V3 is connected to the anode of V2 through condenser C4 while the control grid of V2 is connected to the junction of R2 and R3 through condenser C3. Due to the fall in anode voltage, therefore, the control grid potential of V3 falls to a greater extent than the control grid voltage of V2. It is arranged, by a suitable choice of component values, that the control grid of V2 falls almost to the cut off voltage while that of the valve V3 also falls and is maintained at a steady value of −4 volts (i. e. slightly in excess of the cut-off voltage) by means of the diode V4.

Current now flows into the condenser C3 through R6 and the potential of the control grid of V2 tends to rise thereby still further reducing the anode voltage. This fall in anode voltage is fed back through C3 to the control grid so as to oppose the tendency of the control grid voltage to rise. In fact, the anode voltage falls substantially linearly until it approaches the cathode potential i. e. earth, and the duration of the linear fall of anode voltage can be shown to be approximately $$\frac{Ep}{E1} \cdot R6C3$$

where E1 is the voltage of the source connected to R6.

When the anode voltage of V2 approaches earth, the fall in anode voltage ceases and, with it, the feed back to the control grid. The potential of the control grid now rises. A similar action takes place on the control grid of V3 which, since it is held by the diode V4 just below cut-off, at −4 volts, quickly cuts the grid base, so that V3 draws a heavy anode current. The resulting sharp fall in anode voltage is conveyed by C5 to the suppressor grid of V2 which is thereby cut off. The cessation of anode current in R3 causes the anode voltage to rise almost instantaneously and thus produces an equally rapid rise of the control grid of V3. This ensures a rapid cut off on the suppressor grid of V2. The anode voltage of V2 rises to the value of Ep on a time constant approximately equal to R2 (C3+C4+stray capacity from anode to earth). The circuit is now quiescent and remains so until the arrival of the next triggering pulse on the suppressor grid of V3.

Since the duration of the linear run-down period depends upon Ep and E1, the duration may be varied by varying one or both these voltages. Alternatively E1 may be varied during the run-down period and by this means a non-linear law of run-down may be obtained.

In addition to the method of triggering described above, further methods exist of which one consists of the application of a negative pulse of, say, 10 volts amplitude to the grid of V3 and a second the application of a negative pulse of, say, 20 volts amplitude to the cathode of V1. With the method of triggering shown in Figure 1, as soon as the suppressor grid of V3 is cut off, the screen has to take the current diverted from the anode. This causes the voltage of the screen grid to fall and it is unable to rise until the control grid is cut off. A negative pulse thus appears at the beginning of the voltage square wave on the screen grid. The width of this pulse is a measure of the time taken to trigger the circuit and can be reduced to less than ¼ microsecond. This pulse will not occur in the two methods of triggering mentioned above. To trigger the circuit on the grid of V3, a preferred method is to connect a resistance between earth and the cathode of a diode, the anode of which is connected to the grid, and the triggering voltage is applied across the resistance.

If the circuit is used as a divider, it must be triggered on the cathode of V1 since it is then impossible to retrigger the circuit until the anode voltage of V2 has risen to such a value as to cause V1 again to pass current. If either of the other methods is used it is possible to retrigger the circuit before the return of the quiescent period with resulting instability.

The circuit may be used for high precision range measurement in radar equipment and is especially suited for maximum ranges less than 20 micro-seconds. It may also be used as a divider and high speeds may be obtained e. g. as a divider by ten having a total period of 14 microseconds. Finally it may be used as a time base circuit, the discharge waveform being applied to the Y plates of the cathode ray tube while the square wave is employed for blackout purposes.

Comparing the present circuit with that disclosed in the above-mentioned co-pending application, in the first place the maximum anode current can be increased, the limit being set only by the valves used. This fact, together with the possibility of larger leak currents (i. e. current flow in R6), means that rates of run-down much greater than those obtainable with the earlier circuit are possible for given values of Ep. The present circuit is thus especially valuable for short ranges. Further the circuit does not need short suppressor base valves and in fact it is not essential to use pentodes. Tetrodes and other multi-grid valves, which are made in more satisfactory types than the short suppressor base valves and have much greater current handling capacity, may often be used with advantage.

The maximum rate of fall of anode voltage of V2 for a given valve is limited mainly by the screen wattage, particularly when the ratio of quiescent period to run-down period is large. The reason for this is that during the quiescent period, all the space current passes to the screen grid of V2 and it is essential that this space current shall be several times greater than the space current during the run-down period since otherwise the anode voltage will not approach the cathode voltage sufficiently closely towards the end of the run-down period.

Figure 3:
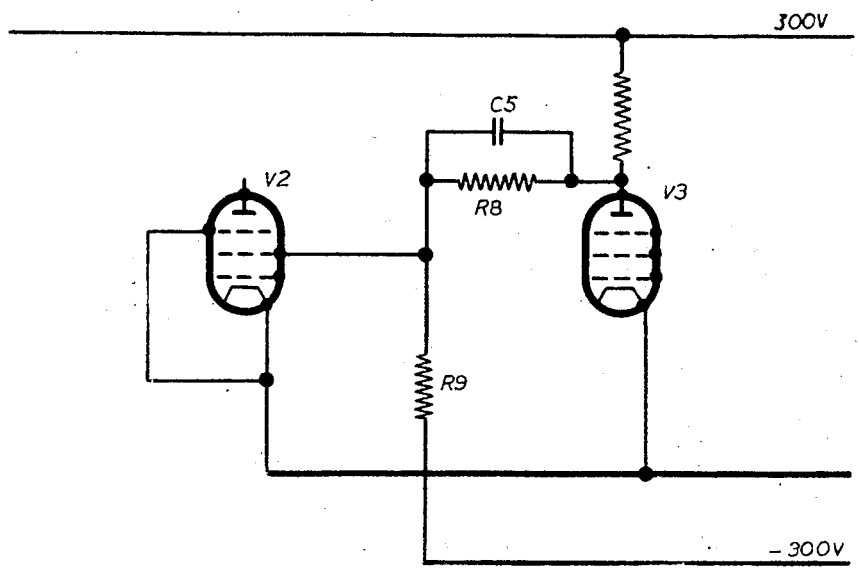
Figures 3, 4 and 5 show alternative arrangements to that of Figure 1.

An alternative circuit which does not involve this limitation is shown in Figure 3 in which the valve V2 is screen controlled instead of suppressor controlled. In this case the flow of screen current is prevented during the quiescent period and, during the run-down period, the screen draws much less current. Further in this embodiment, a valve other than a pentode may be employed for V2.

Referring to Figure 3, which shows only the changes necessary in the circuit of Figure 1, the suppressor grid of V2 is connected to the cathode, the anode of V3 is coupled to the screen of V2 and the resistance R1, diode V5 and condenser C2 are removed. The values of the components C5, R8 and R9 are so arranged, for instance, that the voltage of the screen of V2 changes from −36 volts when the circuit is quiescent and the anode current of V2 is zero to +200 volts when the circuit is triggered. The action of the circuit as a whole together with the methods of triggering is exactly the same as that described for the circuit of Figure 1.

Since the screen wattage limitation has been removed, relatively much greater space currents may be taken in V2. The values of the resistances R2 and R6 may thus be greatly reduced giving very fast operation. Time bases of considerable speed and good linearity have been obtained using rates of run-down up to 100 volts/microsecond. As a range measuring circuit, a rate of run-down of 40 volts/micro-second is readily obtainable, so that very short maximum ranges are available with high accuracy.

Figure 4:
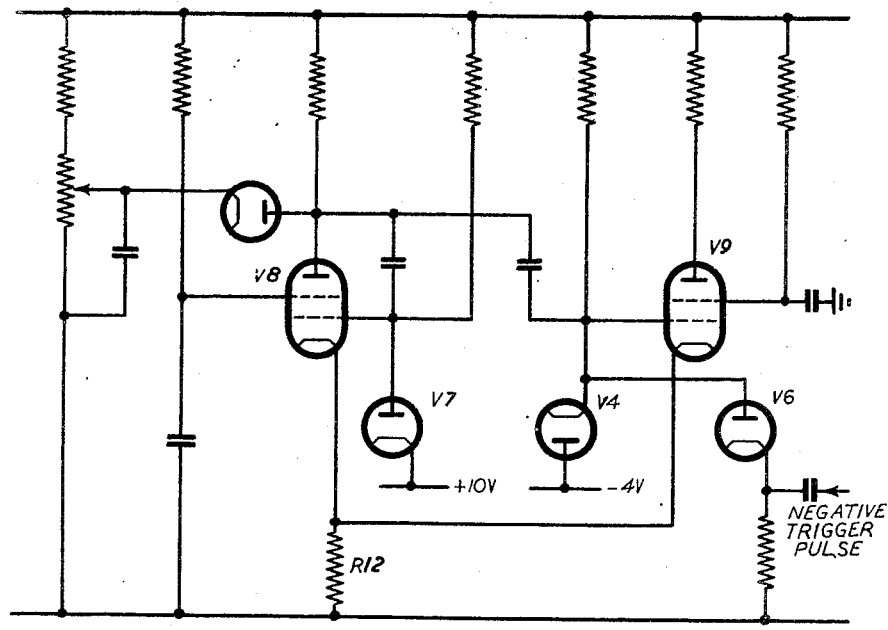
Figure 5:
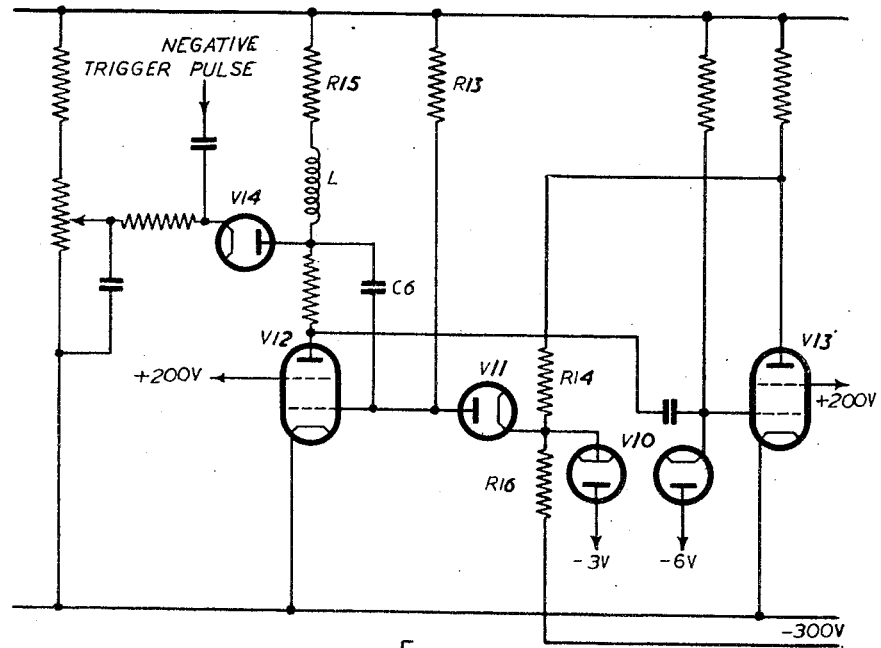

The two embodiments of Figs. 4 and 5 also employ valves other than pentodes. The principle of operation of the circuit shown in Fig. 4 does not differ materially from that of Fig. 1. It has, however, the feature that the control of the run-down valve i. e. the valve V8, is effected by raising the voltage of the cathode above that of the grid instead of cutting off the suppressor.

Before the circuit is triggered, the voltage of the control grid of V8 is maintained at a fixed positive potential, say 10 volts, by the diode V7. The valve V9 is conducting and may be passing grid current. In any case it is drawing sufficient current to raise the cathode of V8 to, for example, +20 volts due to the resistance R12, so that V8 is cut off. The inception of a negative trigger pulse to the cathode of the diode V6 cuts off the valve V9 so that the potential of the cathode of V8 falls and the run-down period begins. At the termination of the run-down period the voltage of the control grid of V9 rises in the manner described with reference to Fig. 1 so that finally V8 is cut off and the anode voltage rises.

The circuit is not strictly a trigger circuit at the instant of commencing the run-down period but tends to revert to the non-run-down condition. Thus the trigger voltage should be applied through a diode V6 as shown or should be of sufficient duration to last for a small proportion of the run-down period. A resistance such as R3 shown in Fig. 1 may be inserted if desired in order to provide trigger action at the end of the run-down period. The circuit shown in Fig. 4 has the advantage that the commencement of the run-down period follows the triggering pulse with even less delay than with the circuit of Fig. 1.

The circuit shown in Fig. 5 has the feature that the control of the run-down valve, i. e. the valve V12, is effected by raising the voltage of the control grid of V12 from beyond the cut off point. In describing the operation of the circuit it will first be assumed that the inductance L and the diode V10 are omitted. In the quiescent state V13 is passing a heavy anode current so that the upper end of R14 (connected through the anode load of V3 to H. T.) is low and the junction point of the resistances R14 and R16 is at a negative potential as a result of the connection of R16 to −300 volts. The diode V11 thus conducts and hence the valve V12 is cut off. The circuit may be triggered, for instance, by applying negative pulses to the cathode of V14 and as a result V13 is cut off and the anode voltage rises, together with the voltage of the junction point of R14 and R16. The cathode voltage of V11 thus rises to a value at which the diode ceases to conduct and the voltage of the control grid of V12 now rises from cut off until the grid base is reached due to the feedback condenser C6 charging through the resistance R13. The run-down period thus begins. At its termination, V13 again conducts followed by V11 and the anode voltage of V12 rises to its quiescent value.

It will be noted that a delay occurs between the inception of the triggering pulse and the commencement of the run-down period due to the fact that the voltage of the control grid of V12 is beyond its grid base. The diode V10 is thus inserted to ensure that V12 cannot be completely cut off, and the value of R15 is reduced until, for this incompletely cut off condition, the voltage of the anode of V14 still rises sufficiently to cause the diode to conduct and so maintain the anode voltage of V12 at a predetermined value. The value of R15 may then be inconveniently low for the run-down cycle and to avoid this disadvantage an inductance L is included in the anode circuit which, by offering a high impedance to changes of voltage, will permit the run-down cycle to occur without the excessive current demands which R15 alone would require. Thus if L is sufficiently large, R15 may be neglected during the feed back period and it can be shown that the additional current due to the load imposed by R15 and L during the run-down period is inversely proportional to L. Hence the value of the inductance may be so chosen that the additional current flowing in the anode load of V12 during the run-down period is as small as desired.

Figure 6:
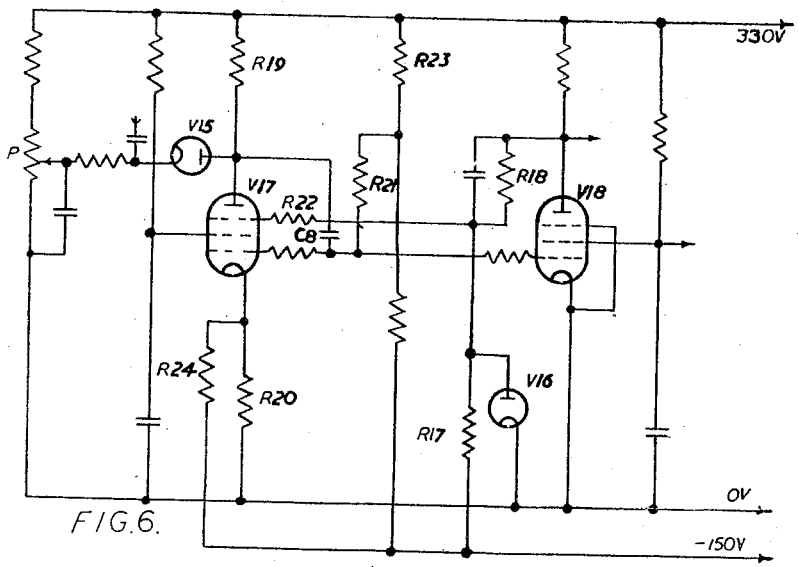
Figure 6 shows the circuit of a second embodiment of the invention.

Referring to Figure 6, the circuit shown is used as a divider to count any number of triggering pulses between certain limits, the number counted being determined by the setting of the potentiometer P, i. e. by the anode potential of V17. It will, of course, be understood that this circuit is equally applicable to the measurement of range while the circuit of Fig. 1 may be used as a divider.

In the quiescent condition, the valve V18 is taking grid current so that anode voltage is low. The anode is D. C. connected to the suppressor grid of V17 through R18 and R22 and the resistance R17 is of such a value that in this condition the suppressor grid of V17 is cut off. The anode voltage of V17 is thus at its maximum value as determined by the setting of the potentiometer P, and the screen grid takes all the space current. The valve V17 does not take grid current since the cathode follows the grid due to resistance R20 in the cathode load. It will be understood that the anode of V18 may be A. C. connected to the suppressor grid of V17 as proposed as an alternative in the circuit of Fig. 1.

Figure 7:
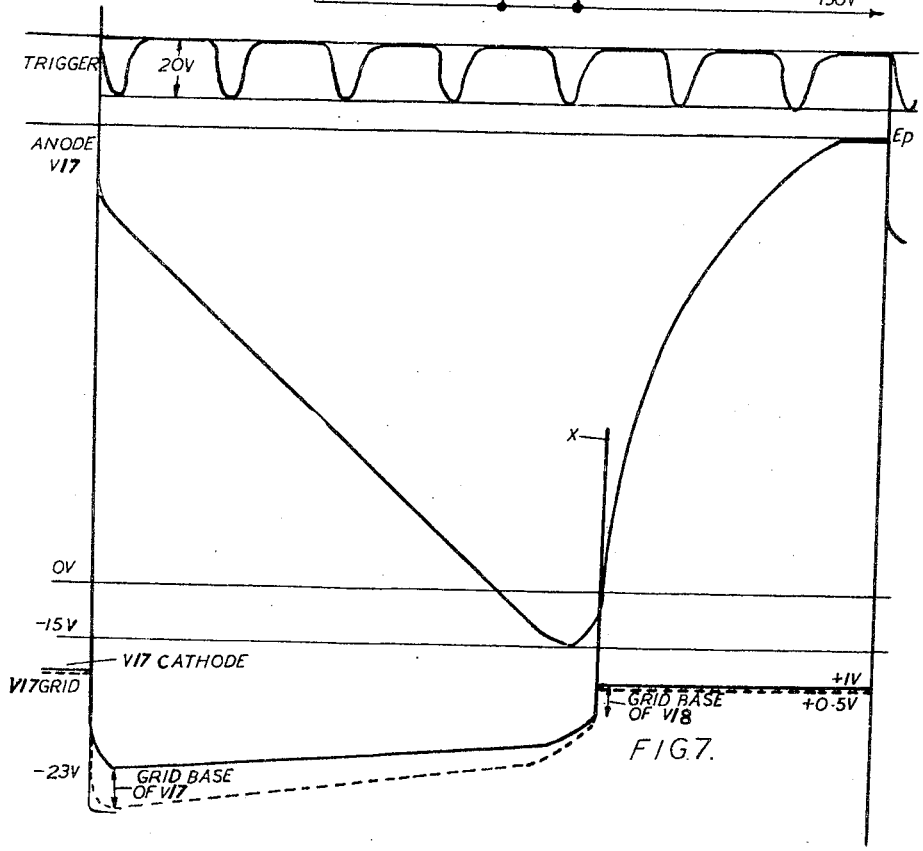
Figure 7 shows the waveforms developed in the circuit of Figure 6.

The circuit is set in operation by negative pulses applied to the cathode of V15. The anode voltage of V15 then falls together with the anode voltage of 17. This fall in anode voltage is transferred through C8 to the control grids of V17 and V18. As regards V18, this valve is now cut off on its control grid so that there is a sharp rise in anode voltage. This results in a sharp rise in the voltage of the suppressor grid of V17 so that anode current flows through V17 and the anode voltage falls. This fall in anode voltage is fed back to the control grid of V17 with the result that the anode, control grid and cathode voltages all fall simultaneously. The cathode voltage falls to a potential determined by the resistances R20 and R24 while the control grid voltage falls almost to cut off as shown in Figure 7.

When this point is reached, the control grid will tend to rise towards the value of the H. T. through R21 and R23. Any rise in the control grid voltage will, however, cause a fall in anode voltage which will be fed back through the condenser C8 to the control grid and will tend to nullify the original rise in control grid voltage. The linear run-down period is thus initiated and continues until the anode voltage of V17 approaches that of the cathode.

When the anode voltage approaches the cathode voltage, the amount of feed-back to the control grid begins to decrease. The control grid voltage, therefore, tends to rise, thereby increasing the space current. The anode is now operating on the knee of the anode current/anode voltage characteristic so that the increasing space current goes to the screen grid and as a result the anode voltage remains substantially constant. There is thus little feed-back to the control grid so that the voltage of the control grid of V17 and also that of the control grid of V18 rise rapidly. Anode current thus flows in V18 and the anode voltage falls causing the suppressor grid voltage of V17, to fall. Anode current in V17 thus ceases and the anode voltage rises. This rise in anode voltage is transferred through C8 to the control grid of V18 which quickly sweeps across its grid base under the influence of the cumulative action (point X in Figure 7). The anode of V17 rises on the time constant R19 (C8+capacity of strays from anode to earth) towards the valve of the H. T. voltage, the final value being held at $Ep$ due to the diode V15. The output may be taken from the anode or screen grid of V18 and will consist of a square waveform, the repetition frequency of which is a predetermined sub-multiple of that of the triggering pulses.

It will be seen that the embodiment of Fig. 6 employs one less valve than that of Fig. 1. The valve V16 in Fig. 6 is the equivalent of V5 in Fig. 1. The circuit linearity is not so good as the circuit of Fig. 1 but is rather better than that of the circuit disclosed in co-pending application Serial No. 762,375. One advantage it has over the circuit of Figure 1 is that two phases of the square wave are obtained, one on the cathode and one on the screen grid. Generally it may be stated that the performance of the circuit lies between that of the circuit of Figure 1 and the circuit disclosed in the above numbered co-pending patent application.

In the circuit shown in Fig. 8, two sets of triggering pulses are employed, one of which triggers the circuit while the other, the frequency of which is usually an integral multiple of the first, controls the return to the quiescent condition, i. e. retriggers the circuit. The object of the circuit is to produce a waveform edge which is accurately locked to one of the re-triggering pulses so that the edge occurs at a precisely known time after the triggering pulse. The usual timing arrangements for producing such an edge consists of a multi-vibrator circuit in which the retriggering pulses are injected into one of the grid circuits. The waveform in the grid circuit has the form of a saw tooth and since the multi-vibrator has the disadvantage that, as small adjustments are made to the time constants, differing parts of the retriggering pulse are used. The whole of the leading edge of the retriggering pulse from the base to the apex may in some cases be used. Thus there is an indeterminancy in the moment of retriggering which amounts to the duration of the leading edge of the retriggering pulse. In the case of the circuit shown in Fig. 8. at the end of the run-down period, the circuit is returned to a semi-stable condition until the arrival of the next retriggering pulse. During this semi-stable condition the grid of the control valve, to which the retriggering pulses are applied, is at a known potential which is unaffected by any adjustments made to vary the duration of the run-down period. Re-triggering of the circuit is thus effected at the same point on the leading edge of the retriggering pulse so that any delay introduced by the slope of this edge is constant.

Referring to Fig. 8 the triggering pulses are applied to the cathode of V21 while the retriggering pulses are applied to the control grid of V23 the operation of the circuit being as follows.

During the quiescent period, the valve V23 is taking grid current through the resistance R35. The value of R35 is high and it is connected to a source of positive potential of 20 volts. The anode voltage of V23 is low so that the suppressor grid of V22 is at a negative voltage sufficient to cut off the flow of anode current in V22. The anode voltage of V22 is maintained at a fixed value $Ep$ determined by the position of the potentiometer P. The control grid of V22 is held at earth potential by the diode V20 current from R29 flowing through the diode. The cathode of V22 follows its grid, owing to the load resistance R36, and rests slightly above the grid voltage. Finally the anode of V19 is at −10 volts owing to resistances R31 and R32 so that the diode is cut off.

When the circuit is triggered by a negative triggering pulse applied to the cathode of V21 through C11 and R28, the cathode potential falls followed by the anode. The anode voltage of V22 also falls and is followed immediately by a fall in the voltage of the control grid of V23 owing to the condenser C10. The valve V23 is thus cut off on its control grid and the anode voltage rises to +200 volts, raising the suppressor grid voltage of V22 rapidly through C8 to a final potential of +5 volts as determined by R33 and R25. Alternatively this rise may be limited to earth potential by means of a diode. Anode current thus flows in V22 causing a sudden voltage drop across R27 which drives the control grid of V23 well into cut off. The fall in voltage at the anode of V22 is fed back through C9 to the control grid, the voltage of which therefore falls followed by that of its cathode. This continues until the grid is almost cut off, the anode voltage falling slightly more than the cathode because of the resistance R27.

When the voltage of the cathode of V22 falls, the anode voltage of V19 also falls and so does the grid of V23 i. e. the cathode of V19 so that the retriggering pulses on the grid are without effect at this time (see Fig. 9). Further as a result of the fall in the anode voltage of V22, the linear run-down period is initiated and it can be shown that the duration of this period is given by $$\frac{Ep}{EL} \cdot R29 \cdot C9$$

where EL is the voltage to which R29 is connected. At the end of the run-down period, the circuit behaves in a similar manner to those shown in Figures 1 and 6, that is to say the anode control grid and cathode of V22 all rise. The cathode of V22 rises to its initial value so that the voltage of the anode of V19 also rises to its initial value of −10 volts and is followed by its cathode. The grid of V23, however, does not rise to its initial value since the time constant C10.R35 is very large. The grid of V23 is thus held at −10 volts which is below the cut off value. The valve V23 does not therefore exert any control function on the valve V22 so that the latter continues to pass anode current. Since however there is no tendency at this time for the voltage on the control grid of V22 to rise, since it is at its stable value, the anode voltage remains constant. This state of affairs, which is the semi-stable condition mentioned above, exists until the next retriggering pulse is applied to the anode of V19. The cathode of V19 follows the anode and this pulse is developed across R34 since the anode of V22 has a low impedance at this time. The grid of V3 thus crosses the grid base rapidly and the anode voltage falls and is followed by the suppressor grid voltage of V22 resulting in V22 being cut off. A sharp rise in anode voltage follows and is transferred to the grid of V23 through C10. The control grid voltage of V23 therefore returns to its initial value and the anode voltage of V22 rises towards H. T. with a time constant given approximately by R26 (C9+C10 + capacitative strays from anode to ground) until it is caught by the diode V21 at the value Ep. The circuit is now in the quiescent condition and remains in this condition until the next repetition pulse is applied.

The output may be taken from the anode or screen of V23 and a precision of ⅓ of a microsecond or better is obtained relative to the retriggering pulse irrespective of the absolute range. The limit is set only by the sharpness of the retriggering pulse.

We claim:

1. Thermionic valve circuit comprising a first valve having an anode, a cathode and at least one controlling electrode between said anode and said cathode, a source of anode voltage for said first valve, a load impedance connected between said anode of said first valve and the positive terminal of said source of anode voltage, a connecting circuit between the negative terminal of said source of anode voltage and the cathode of said first valve, a coupling including a series capacitance between a point on said load impedance and a controlling electrode of said first valve for producing a substantially linear fall of voltage with time on the anode of said first valve when anode current flow is released through said first valve, a second valve having an anode, a cathode and at least one controlling electrode between said anode and said cathode, a source of anode voltage for said second valve, a load impedance connected in series with said source of anode voltage for said second valve between the anode and cathode of said second valve, a coupling between said second valve and said first valve for inhibiting anode current flow through said first valve during conductivity of said second valve, impulse means connected to said thermionic valve circuit for periodically initiating stoppage of anode current flow through said second valve whereby to release anode current flow through said first valve and a further coupling between said first valve and said second valve for inhibiting conductivity of said second valve during a predetermined excursion of the anode voltage of said first valve.

2. A wave cycle circuit for the accurate production of a predetermined change cycle comprising a first electronic tube having an anode, a cathode, a control grid and at least one other grid, a source of space current, circuit means connecting the negative terminal of said source to the cathode of said tube, anode circuit means connecting the anode of said tube to the positive terminal of said source, a resistance connecting said control grid with a point of high positive potential relative to said cathode of said tube, a capacitance connecting said control grid with a point on said anode circuit of said first tube, means connected to said other grid for applying a negative voltage thereto of such value as to initially cut off the anode current flow in said tube, a second electronic tube having an anode, a cathode, a control grid and at least one other grid, circuit means connecting the cathode of said second tube to the negative terminal of said source of space current, anode circuit means connecting the anode of said second tube to a positive terminal of said source of space current, a resistance connecting the control grid of said second tube to a point of high positive potential relative to the cathode of said second tube, means connected to said second tube to so bias it initially that anode current flows therein, an impulse transmitting circuit including a series connected capacitance connecting the anode circuit of said first tube to the control grid of said second tube, circuit means connecting said anode of said second tube to a grid of said first tube, and impulse applying means connected to the circuit to change the bias on said first tube so as to start the flow of anode current in said first tube and initiate the wave cycle whereby a small initial fall of anode voltage, steep rates of fall of anode voltage and a highly accurate linearity of anode voltage fall are obtained together at said first tube with wide flexibility of application.

3. The combination set forth in claim 2, wherein said impulse applying means are connected to said impulse transmitting circuit by way of rectifying means.

4. A wave cycle circuit for the accurate production of a predetermined change cycle comprising a first electronic tube having a cathode, a control grid, a second grid and an anode in that order, a second electronic tube having a cathode, a control grid, a second grid and an anode in that order, a coupling circuit including a series connected capacitance between said anode and said control grid of said first tube, circuit means traversible by direct-current connecting the said second grid of said first tube with the anode of said second tube, a source of high negative voltage connected to said direct-current circuit means, circuit means traversible by alternating current connecting the anode of said first tube and the control grid of said second tube, a source of positive voltage connected to said alternating current circuit means, a source of space current for said tubes, anode circuits each including load impedances connected between the positive terminal of said source and the respective anodes of said first and second tubes, circuit means connecting the negative terminal of said source with the respective cathode of said first and second tubes and impulse applying means connected to the second grid of said second tube, whereby a negative impulse cuts off the anode current of said second tube, causes a sharp positive rise in the voltage of said second grid of said first tube and the anode current of said first tube to flow with a resulting drop in the anode voltage of said first tube constituting an initiating of the wave cycle characterized by a small initial fall, high available rates of linear fall and high linearity of fall, 5. A wave cycle circuit for the accurate production of a predetermined change cycle comprising a first electron tube having a cathode, an anode, a control grid and a second grid, a second tube having a cathode, an anode, a control grid and a second grid, a source of space current for said first and second tubes, circuit means connecting the negative terminal of said source to said cathodes of said tubes, an anode circuit including a load resistance connecting said anode of said first tube to a positive terminal of said source, an anode circuit including a load resistance connecting said anode of said second tube to a positive terminal of said source, a coupling circuit including a series capacitance between a point on said anode circuit of said first tube and said control grid of said first tube circuit means connecting said second grid of said first tube and the anode of said second tube, negative biasing means connected to said circuit means, impulse applying means connected to the second grid of said second tube whereby a negative applied impulse cuts off the anode current of said second tube, and causes the anode current of said first tube to flow with a resulting drop in anode voltage constituting an initiating of the wave cycle characterized by a small initial fall, high available rates of linear fall and high linearity of fall.

6. The combination set forth in claim 5, which includes circuit means connecting the anode of said first tube and the control grid of said second tube whereby a voltage fed from the anode of said first tube to the control grid of said second tube initiates the return of the circuit to the quiescent condition at the end of the period of fall of anode voltage of said first tube.

7. The combination set forth in claim 5, a circuit coupling between the control grid of said first tube and the control grid of said second tube whereby said series capacitance coupling circuit between the anode and control grid of said first tube also serves as a voltage feed between the anode of said first tube and the control grid of said second tube.

8. The combination set forth in claim 5, which includes a second condenser connected between the anode of said first tube and the control grid of said second tube and serving as a voltage feed therebetween.

9. A thermionic valve circuit for producing a predetermined cycle of changes in response to an applied impulse and comprising a first thermionic valve having at least four electrodes including a control grid and a further grid intermediate an anode and a cathode, a source of space current, an anode circuit including an anode load impedance between said anode of said valve and a positive terminal of said source of space current, a connection from the control grid of said valve through a resistance to a point of high positive potential and through a capacitance to the anode circuit of said first valve, means for biasing another electrode of said first valve so that in the initial quiescent state of the circuit no anode current flows in said first valve, a second thermionic valve also having at least four electrodes including a control grid and a further grid intermediate an anode and a cathode, an anode circuit including an anode load impedance between said anode of said second valve and a positive terminal of said source of space current in connection from the control grid of said second valve through a resistance to a point of positive potential, means for biasing said second valve so that in the initial quiescent state of the circuit anode current flows in said second valve, a coupling circuit capable of passing impulse signals connecting the anode circuit of said first valve and the control grid of said second valve, a further coupling circuit connecting another electrode of said first valve to said second valve and means for applying input impulses to the circuit so as to start thereby a flow of anode current in said first valve to initiate said cycle.

10. A circuit according to claim 9 and in which said impulse applying means is arranged to supply said impulses to said second valve and to inhibit anode current therein and so to produce an impulse which is applied by way of said further coupling circuit to said other electrode of said first valve to start a flow of anode current in said first valve.

11. A circuit according to claim 9 and in which said impulse applying means is arranged to supply said impulses through a unilateral conducting device to the anode of said first valve.

12. A wave cycle circuit for the accurate production of a predetermined cycle change comprising first and second electron tubes each having a cathode, an anode and at least a control grid intermediate said anode and cathode, a source of anode current for said tubes, circuit means connecting the negative terminal of said source to each of the cathodes of said tubes by way of a common cathode resistance, first and second anode circuits each including a load resistance connecting the respective anodes of said first and second tubes to a positive terminal of said source, a coupling circuit including a series capacitance between a point on said first anode circuit and the control grid of said first tube, circuit means connecting the anode of said first tube to the control grid of said second tube, means for applying a negative bias to said control grid of said second tube, means for applying a positive bias to the control grid of said first tube and impulse applying means connected to the control grid of said second tube, said second tube being normally conducting and said first tube being normally cut-off whereby a negative applied impulse cuts off the anode current of said second tube and causes the anode current of said first tube to flow with a resulting drop in anode voltage constituting an initiating of the wave cycle characterized by a small initial fall, high available rates of linear fall and high linearity of fall.

FREDERIC CALLAND WILLIAMS.
NORMAN F. MOODY.

REFERENCES CITED

The following references are of record in the file of this patent:

UNITED STATES PATENTS

| Number | Name | Date |
|---|---|---|
| 2,114,938 | Puckle | Apr. 19, 1938 |
| 2,252,457 | Cockrell | Aug. 12, 1941 |
| 2,291,045 | Lancor | July 28, 1942 |
| 2,405,237 | Ruhlig | Aug. 6, 1946 |
| 2,412,485 | Whiteley | Dec. 10, 1946 |
| 2,418,364 | Moe | Apr. 1, 1947 |

OTHER REFERENCES

Review of Scientific Instruments, vol. 12, January 1941, "A Hard Vacuum Tube Pulse Equalizing Sharpening Circuit," by Huntoon et al., pages 35 and 36.